Nov. 15, 1966 O. ASCHWANDEN 3,285,094

DISC CAM DEVICE

Filed Aug. 25, 1964

Inventor
Oskar Aschwanden
By Watson, Cole, Grindle & Watson
Attys.

United States Patent Office 3,285,094
Patented Nov. 15, 1966

3,285,094

DISC CAM DEVICE

Oskar Aschwanden, Zurich, Switzerland, assignor to Micro-Electric A.G., Zurich, Switzerland Filed Aug. 25, 1964, Ser. No. 391,889
Claims priority, application Switzerland, Sept. 2, 1963, 10,910/63
9 Claims. (Cl. 74—568)

This invention relates to a disc cam device with at least one disc cam adjustable along a shaft. The adjustable cam can also be rotated on its shaft in the circumferential direction.

A previously proposed disc cam has at one end a series of teeth arranged in an annular row. At the hub fast with the shaft there is a three arm star of which the individual arms are constructed as leaf springs, which engage at their ends in the teeth. These teeth and the ends of the leaf springs together constitute a ratchet device.

The pressures exerted by the three arms of the star in this known cam arrangement are unequal, that is with the same force on the cam, for example as a result of fatigue of a leaf spring, so that the cam is axially loaded unequally and this may give rise to a wobble. One of the basic problems of the invention is to overcome this disadvantage.

According to the present invention there is provided a disc cam device comprising at least one disc cam adjustable on a shaft, a member fast for rotation with the shaft, a ratchet device arranged between the disc cam and the said member which include a row of teeth and a projection which can engage in or ratchet over the teeth, and markings on the cam disc which include numbers and scale divisions in relief on a concentric frusto-conical part of the cam disc.

Two embodiments of a disc cam device in accordance with the invention will now be described by way of example, with reference to the accompanying diagrammatic drawing, in which.

Figure 2:
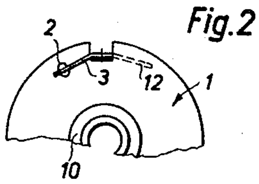
FIG. 2 is a fragmentary view in the direction of the arrow A of FIG. 1.

Referring now to the drawings, a member 1 constructed in the form of a disc is fast for rotation on a shaft not shown. This member 1 carries a projection in the form of a ball 2, which is mounted in a bracket 3 which acts as a leaf spring. A disc cam 4 (FIGS. 3, 4) has a peripheral cam surface 5, an internally-toothed ring 6, as well as a truncated cone 7 lying within cam 5 and ring 6. The toothed ring 6 lies coaxially with the axle 11 of the cam disc 4 and parallel thereto. The truncated cone 7 lies in the region of the periphery of the cam disc 4. Relief lettering and a scale are formed on the truncated cone 7 and consist of numbers 8 and division lines 8*a*. The cam disc 4 together with the truncated cone 7 and the lettering 8, 8*a* preferably consist of a part, in practice, manufactured of synthetic resin. The cam disc 4 is rotatably mounted on its bore 9 on a hub 10 of the member 1. The ball 2 then lies radially within the toothed-ring 6 and forms therewith a ratchet. If these ratchets 2, 6 are formed as free wheel devices, then on the bracket 3 a further leaf sprring 12 is provided (FIG. 2). This leaf spring 12 ratchets in one direction over the teeth of the toothed ring 6; in the other direction it engages against the flanks of the teeth and prevents movement in this direction.

Figure 1:
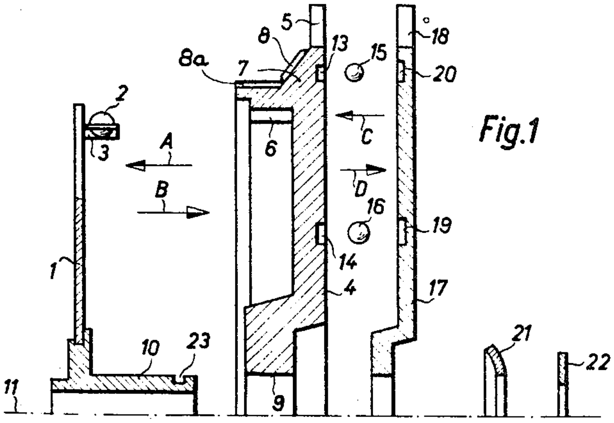
FIG. 1 is an exploded view of one half of a disc cam, to an enlarged scale, with the individual parts in longitudinal section.
Figure 4:
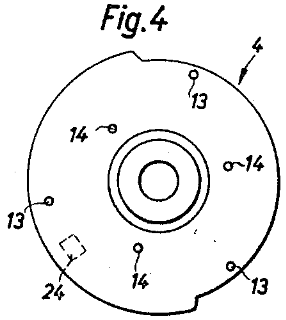
FIG. 4 is a view in the direction of the arrow C of FIG. 1.

In one side face of the cam disc 4 three recesses 13 are arranged (FIGS. 1, 4) spaced apart over a circular path by 120° from one another. In another circular path likewise spaced apart by 120° are three other recesses 14 (FIGS. 1, 4). In these recesses 13, 14 (FIG. 1) balls 15, 16 can be partially engaged.

Figure 5:
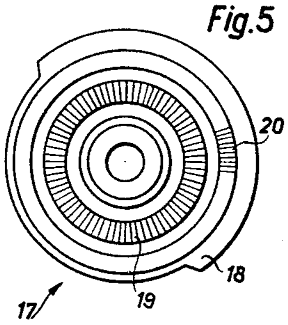
FIG. 5 is a view in the direction of the arrow D of FIG. 1.

A cam disc 17 (FIGS. 1, 5) which is likewise rotatably mounted on the hub 10 has a cam surface 18. This cam disc 17 has two coaxial annular rows of teeth 19, 20 (FIG. 5). The teeth 20 of the outer row are only partly shown. The balls 15 form together with the teeth 20 a ratchet device and the balls 16 together with the teeth 19 likewise form a ratchet device. The spacing of the teeth 19 is coarser than the spacing of the teeth 20. In the one, inner row there are provided for example, fifty teeth 19; the other, outer row has for example, one hundred and twenty teeth 20.

Either the ratchet device formed by the balls 15 and teeth 20 or the ratchet device formed by the balls 16 and teeth 19, is employed, according to whether a finer or a coarser sub-division of the periphery and thus a finer or a coarser adjustment of both cam discs 4 and 17 is desired.

If both cam discs 4, 17 are mounted on the hub 10, then a Belleville spring washer abuts against the disc 17 and a safety ring 22 is fixed in a groove 23 of the hub 10 so that both of the cam discs 4, 17 are biased towards one another under peripheral spring loading to lie against the balls 15 or 16 inserted between the cam discs. The cam disc 17 is elastically deflected to some extent in axial direction on rotation of the cam discs 4 and 17 with respect to one another.

If it is desired to construct the ratchet devices 15, 20 or 16, 19 as free-wheeling or one-way clutches, then a leaf spring 24 is interposed (FIGS. 4, 6) for example in the circular path of the recesses 13, of which the resilient part 24 slides over the teeth 20 in one direction and in the other direction engages the flanks of the teeth 20 and prevents rotation. The spring 24 can naturally lie also in the circular path of the recesses 14. The resilient part 25 of the leaf spring 24 then engages the teeth 19.

Figure 7:
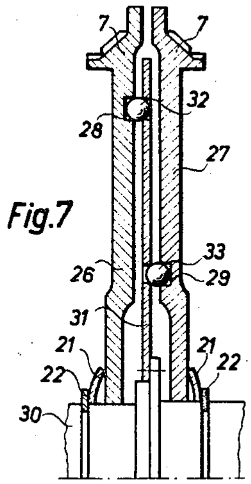
FIG. 7 is one half of an alternative embodiment of a disc cam device in accordance with the invention.

In FIG. 7 two disc cams 26, 27 are provided which are mirror images of one another, whereby the truncated cones thereof are arranged on the sides turned away from each other. The disc cam 26 has one annular row of teeth 28; a disc cam 27 likewise has an annular row of teeth 29. The teeth 28, 29 are thus arranged as the teeth 19, 20 in FIG. 5. Both disc cams 26, 27 are rotatably mounted on a shaft 30. Between the disc cams 26, 27 the disc member 31 is so mounted that is corresponds to the member 1 and is rotatably mounted with the shaft 30. Balls 32, 33 are mounted in apertures in the member 31 and form ratchet devices with the corresponding teeth 28 or 29. It is possible to provide more such balls 32 in a circular path, as ball 15 in FIG. 4. The same applies to the balls 33. For rotation of the cam discs 26 or 27 relative to the member 31, the cam disc 26 or the member 31 can be made resilient so that the three balls 32 spaced about a periphery within the toothed ring 28 can travel freely. The same applies to the cam disc 27 with its teeth 29 and the ball 33.

Both cam discs 26, 27 are resiliently urged together by means of two Belleville spring washers 21 and two safety rings 22.

The cam discs according to FIG. 7 can also be so built that the teeth 29 are arranged as an annular row, which has the same diameter as the row of teeth 28. The balls 32 mounted in the member 31 thus project from both sides of the member 31 and so form ratchet devices both with the teeth 28 and also with the teeth 29. The balls 33 can then be omitted.

In the embodiment of FIG. 1 the teeth 19, 20 can also be provided in the cam disc 4 and the recesses 13, 14 in the cam disc 17. Likewise, in the embodiment of FIG. 7 the teeth 28, 29 can be provided in the member 31 and the recesses for the balls 32, 33 can be provided in the cam discs 26, 27. In place of individually mounted balls 15, 16 or 32, 33 or 2 in the recesses 13, 14 or other forms of projections suitable to this purpose can be provided. Thus in place of the ball 2 a leaf spring can be bent to form a catch, which engages in the teeth 6 (FIG. 1). In place of the balls 15, 16 the disc 4 can be provided with pin-like projections, and likewise the discs 26, 27 or 31.

In the cam disc device in accordance with the invention the teeth extend as far as possible towards the periphery of the cam discs, so that the forces generated within the ratchet devices are held to a small value and a large degree of adjustability is possible as a result of the large sub-division of the peripheral angle. In FIG. 1 the parts 2, 3 lie radially within the disc 4, and the discs 4, 17 as well as 26, 27 in FIG. 7 can be adjusted without special springs as a result of their own elastic construction. Thereby a smaller axial constructional length results. As a result of the elastic deformability of the discs 17, 26, 27 and 31 in axial direction these can be rotatably adjusted with respect to one another without axial displacement of the middle portions thereof.

Figure 6:
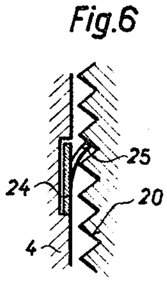
FIG. 6 is a part, to an enlarged scale, as shown in FIGS. 4 and 5.

If the ratchets 2, 6, 15, 20 in FIG. 1 are constructed as unidirectional free-wheel devices by means of the leaf springs 12 and 24 shown in FIGS. 2 and 6, then it is preferable that both free-wheels should operate in different senses. The one ratchet device thus prevents rotation in a clockwise direction and the other prevents rotation in an anti-clockwise direction. If, for example, the cam disc 17 is rotated relatively to the cam disc 4, then the cam disc 4 cannot rotate relatively to the member 1 in the same direction of rotation.

Figure 3:
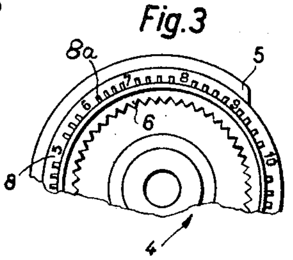
FIG. 3 is a fragmentary view in the direction of the arrow B of FIG. 1.

Furthermore the cam devices as hereinbefore described can easily be mounted and have markings as shown in FIGURE 3 spaced around and easily read on its periphery. This marking consists of numbers and lines which are lightly marked but are also very durable.

In the disc cam device with two individually rotatably adjustable cam discs, as shown in FIG. 1 or 7, the radially projecting cams 15, 18 of both discs may be used to actuate a common cam follower (not shown). The cams of the two discs then form together a variable cam, the peripheral or operative length of which may be changed by rotatably adjusting one disc with respect to the other. By rotating both cam discs 1, 17 or 26, 27 with respect to the non-rotatable member 1 or 31, the combined cam may be angularly displaced relative to the hub 10 or shaft 30, respectively.

The arrangement is also constructed as a unit and in the axial direction takes up a small space. Thus it is possible to provide an arrangement of several such units adjacent one another, for example in an electric switching block which has a small axial length.

What I claim is:

1. A disc cam device comprising a member, at least one cam disc rotatably adjustable on the member, a member mounted coaxially on said member and non-rotatable thereon, at least one positive ratchet device provided between the cam disc and the non-rotatable member, said ratchet device including a row of teeth and a spring-biased projection co-operating with said teeth for locking the cam disc in the desired position, said cam disc having an outer rim a portion of which is axially projecting towards and surrounding at least partially the non-rotatable member, said rim having a frusto-conical outer surface carrying a dial-like scale, and at least one cam arranged at the periphery of said rim and protruding radially from the edge of larger diameter of the frusto-conical surface, and said row of teeth being of approximately equal diameter as the axially projecting portion of said rim.

2. A device according to claim 1, in which the row of teeth is arranged at the inner surface of the axially projecting portion of the rim, and the spring-biased projection is arranged on the non-rotatable members so that it is resiliently movable in radial direction only.

3. A device according to claim 1, in which a second rotatably adjustable cam disc is provided coaxially arranged on that side of the first cam disc opposite the non-rotatable member, said second cam disc being elastically deformable in axial direction, at least one further positive ratchet device being provided between the first and second cam discs, said further ratchet device including at least one coaxial annular row of teeth and at least one projection co-operating with said teeth for locking the second cam disc with respect of the first-mentioned cam disc, and said row of teeth and projections being arranged at the axial end-faces of the cam discs facing one another, respectively.

4. A device according to claim 1, in which a second rotatably adjustable cam disc is provided coaxially arranged on that side of the non-rotatable member opposite to the first-mentioned cam disc, the two cam discs being of identical shape and arranged in mirror fashion symmetrically with respect of the non-rotatable member, the axially projecting portions of both cam discs surrounding at least partially the non-rotatable member, and at least one further ratchet device, is provided between said second cam discs and the non-rotatable member, and said ratchet device including a row of teeth and at least one spring-biased projection co-operating with said teeth for locking the second-mentioned cam disc in the desired position.

5. A device according to claim 1, in which a second rotatably adjustable cam disc is provided coaxially arranged on that side of the non-rotatable member opposite to the first-mentioned cam disc, the two cam discs being of identical shape and arranged in mirror fashion symmetrically with respect of the non-rotatable member, the axially projecting portions of both cam discs surrounding at least partially the non-rotatable member, and at least one further ratchet device, is provided between said second cam disc and the non-rotatable member, and said ratchet device including a row of teeth and at least one spring-biased projection co-operating with said teeth for locking the second-mentioned cam disc in the desired position, the rows of teeth and the projections co-operating therewith being arranged on the axial end-faces of the two cam discs facing one another and on the axial end-faces of the non-rotatable member, respectively, and the two cam discs being elastically deformable in axial direction.

6. A device according to claim 1, in which a second rotatably adjustable cam disc is provided coaxially arranged on that side of the first cam disc opposite the non-rotatable member, said second cam disc being elastically deformable in axial direction, at least one further positive ratchet device being provided between the first and second cam discs, said further ratchet device including at least one coaxial annular row of teeth and at least one projection co-operating with said teeth for locking the second cam disc with respect of the first-mentioned cam disc, and said row of teeth and projections being arranged at the axial end-faces of the cam discs facing one another, respectively, and the frusto-conical surface of the first-mentioned cam disc being arranged on that side turned away from the second cam disc.

7. A device according to claim 1, in which a second rotatably adjustable cam disc is provided coaxially arranged on that side of the non-rotatable member opposite to the first-mentioned cam disc, the two cam discs being of identical shape and arranged in mirror fashion symmetrically with respect of the non-rotatable member, the axially projecting portions of both cam discs surrounding at least partially the non-rotatable member, and at least one further ratchet device, is provided between said second cam disc and the non-rotatable member, and said ratchet device including a row of teeth and at least one spring-biased projection co-operating with said teeth for locking the second-mentioned cam disc in the desired position, the frusto-conical surfaces of the first and second cam discs being arranged on those sides turned away from each other.

8. A device according to claim 1, in which a second rotatably adjustable cam disc is provided coaxially arranged on that side of the first cam disc opposite the non-rotatable member, said second cam disc being elastically deformable in axial direction, at least one further positive ratchet device being provided between the first and second cam discs, said further ratchet device including at least one coaxial annular row of teeth and at least one projection co-operating with said teeth for locking the second cam disc with respect to the first-mentioned cam disc, and said row of teeth and projections being arranged at the axial end-faces of the cam discs facing one another, respectively, said ratchet devices being constructed as uni-directional free-wheeling devices permitting rotation of the two cam discs with respect to one another in opposite directions only.

9. A device according to claim 1, in which a second rotatably adjustable cam disc is provided coaxially arranged on that side of the non-rotatable member opposite to the first-mentioned cam disc, the two cam discs being of identical shape and arranged in mirror fashion symmetrically with respect of the non-rotatable member, the axially projecting portions of both cam discs surrounding at least partially the non-rotatable member, and at least one further ratchet device, is provided between said second cam disc and the non-rotatable member, and said ratchet device including a row of teeth and at least one spring-biased projection co-operating with said teeth for locking the second-mentioned cam disc in the desired position, said ratchet devices being constructed as uni-directional free-wheeling devices permitting rotation of the two cam discs with respect to the non-rotatable member in opposite directions only.

References Cited by the Examiner

UNITED STATES PATENTS

| | | | |
|---|---|---|---|
| 2,133,469 | 10/1938 | Oberfell | 74—553 |
| 2,705,428 | 4/1955 | McCullough | 74—575 |
| 2,770,982 | 11/1956 | Mastney et al. | 74—527 |
| 2,836,082 | 5/1958 | Miner | 74—527 |

FRED C. MATTERN, Jr., *Primary Examiner.*

MILTON KAUFMAN, *Examiner.*

W. S. RATLIFF, *Assistant Examiner.*